United States Patent
Wang et al.

(10) Patent No.: US 7,742,409 B2
(45) Date of Patent: Jun. 22, 2010

(54) METHOD AND APPARATUS FOR COMPENSATING FOR PERFORMANCE DEGRADATION OF AN APPLICATION SESSION

(75) Inventors: Jia Wang, Randolph, NJ (US); Balachander Krishnamurthy, New York, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 289 days.

(21) Appl. No.: 11/893,227

(22) Filed: Aug. 15, 2007

(65) Prior Publication Data

US 2009/0046589 A1    Feb. 19, 2009

(51) Int. Cl.
*H04L 1/00* (2006.01)

(52) U.S. Cl. ............... 370/230; 370/225; 370/232; 370/235; 370/237; 370/244; 709/224; 709/225; 714/2; 714/25; 714/48; 726/23; 726/27

(58) Field of Classification Search ............... 370/230, 370/232, 235, 237, 242, 244, 217, 225; 709/224, 709/225; 714/2, 25, 48; 726/23, 27
See application file for complete search history.

(56) References Cited

U.S. PATENT DOCUMENTS

| | | | | |
|---|---|---|---|---|
| 6,091,962 | A  * | 7/2000 | Bonta | 455/502 |
| 6,807,426 | B2 * | 10/2004 | Pankaj | 455/453 |
| 6,963,983 | B2 | 11/2005 | Munson et al. | |
| 7,058,974 | B1 * | 6/2006 | Maher et al. | 726/13 |
| 7,489,632 | B2 * | 2/2009 | Lakkakorpi | 370/231 |
| 7,502,317 | B2 * | 3/2009 | Joshi et al. | 370/230 |
| 2002/0186658 | A1 * | 12/2002 | Chiu et al. | 370/237 |

* cited by examiner

*Primary Examiner*—Ricky Ngo
*Assistant Examiner*—Luat Phung

(57) ABSTRACT

Disclosed is a method and apparatus for compensating for a performance degradation of an application session in a plurality of application sessions associated with a network link. The performance of each application session in the plurality of application sessions associated with the network link is determined. The performance of each application session in the plurality is then compared. From this comparison, a lowest performance application session in the plurality of application sessions is identified. Corrective action is performed on packets scheduled to be transmitted over the lowest performance application session.

21 Claims, 2 Drawing Sheets

METHOD AND APPARATUS FOR COMPENSATING FOR PERFORMANCE DEGRADATION OF AN APPLICATION SESSION

BACKGROUND OF THE INVENTION

The present invention generally relates to networks and more specifically to compensating for performance degradation of an application session.

Routers in a network forward packets from one network component to another network component. A network component is a computer (e.g., a router or switch) that communicates over the network. Each router is typically connected to several network components via router links. If a particular router link to a network component is overwhelmed for any reason, the traffic has to be rerouted to the network component (e.g., another router) via another link. A link may be overwhelmed because of a legitimate traffic increase or because of an attack aimed at disrupting communication.

Existing solutions to an overwhelmed router link is to use traffic engineering (i.e., mechanisms or strategies used to ease router link traffic) and quality of service (QoS) mechanisms (i.e., a guaranteed throughput level for the link) on each link. These solutions, however, are operationally expensive because they add significant overhead to router operation.

There is no way to "selectively" reroute traffic belonging to particular links. In particular, routing is typically performed by the destination address of a packet. Packets having the same destination address conventionally follow the same paths (i.e., links). Therefore, there is no easy way to route traffic having the same destination address using different links. There remains a need to selectively and efficiently reroute traffic traveling over network links.

BRIEF SUMMARY OF THE INVENTION

In accordance with an embodiment of the present invention, the performance of an application session in a plurality of application sessions associated with a network link is determined. The performance of each application session is then compared. From this comparison, a lowest performance application session in the plurality of application sessions is identified. Corrective action is performed on packets scheduled to be transmitted over the lowest performance application session. Corrective action may include rerouting the scheduled packets to another application session (e.g., by appending the packets into a different queue of the application session) or rerouting the scheduled packets to another network link.

When all of the application sessions of a network link experience performance degradation, this is typically the result of normal congestion. When a particular application session experiences the worst performance compared with the performance of other application sessions in the plurality of application sessions (i.e., the lowest performance application session), the lowest performance application session is experiencing an attack. In one embodiment, the lowest performance application session is an application session having a priority level above a priority threshold. As a result, the lowest performance application session is a high priority application session, meaning that the application session is associated with packets that are of high importance.

These and other advantages of the invention will be apparent to those of ordinary skill in the art by reference to the following detailed description and the accompanying drawings.

DETAILED DESCRIPTION

Figure 1:
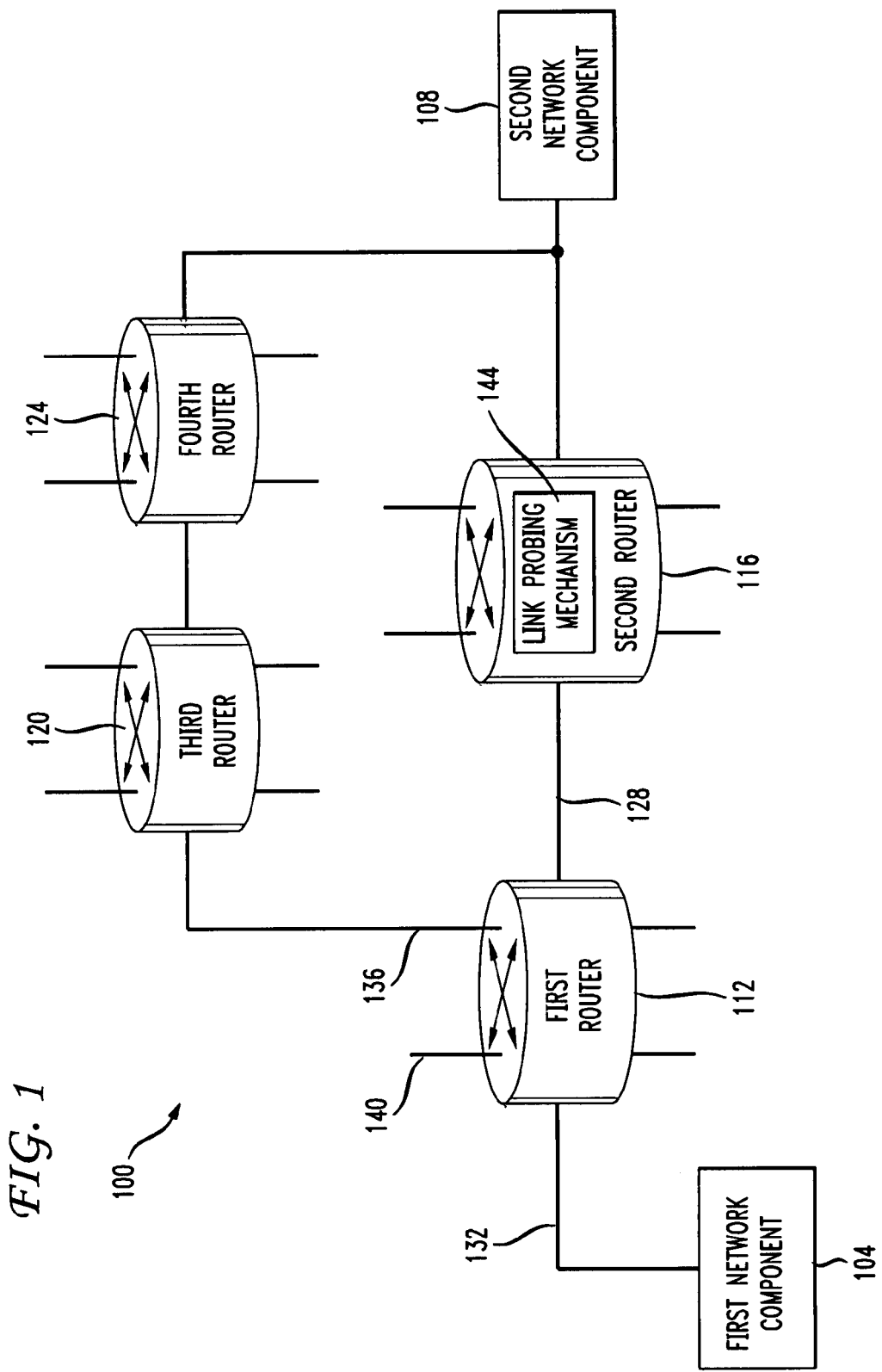
FIG. 1 is a block diagram of a network having routers transmitting packets between a first network component and a second network component in accordance with an embodiment of the present invention.

FIG. 1 shows a block diagram of a network 100 having routers transmitting packets between a first network component 104 and a second network component 108 in accordance with an embodiment of the present invention. Specifically, the first network component 104 is in communication with a first router 112. The first router 112 is in communication with a second router 116 and a third router 120. The third router 120 is in communication with a fourth router 124. The second router 116 and the fourth router 124 are both in communication with the second network component 108.

As described in more detail below, each network component 104, 108 is a computing device, such as a laptop, desktop, personal digital assistant (PDA), router, etc., that communicates over the network 100. Similarly, each router 112-124 is also a computing device, such as a router or a switch.

Each router transmits packets to other network components (e.g., other routers, the first network component 104, or the second network component 108) via one or more application sessions (i.e., software applications). For example, different application sessions may use different ports of a router. Each application session typically has a priority assigned to it corresponding with the packets that the session transmits. The priority may be, for example, one of several settings (e.g., low, medium, or high) or may be assigned a number (e.g., 5 out of 10). The priority is typically set by a router administrator.

Application sessions transmit packets between network components via a network link. A network link is the physical cable between two network components and enables communication of packets between the two network components. Packets that are scheduled to be transmitted by an application session are stored in an associated queue of the router, such as a First-In-First-Out (FIFO) queue. Each application session may be associated with a different queue.

As shown in FIG. 1, the first router 112 communicates with the second router 116 over a first-to-second router link 128. The first router 112 communicates with the first network component 104 over a first-router-to-first-network-component link 132. The first router 112 communicates with the third router 120 over a first-to-third-router link 136. The first router 112 also includes additional links connected to additional network components, such as link 140. Similarly, the other routers 116, 120, 124 have links which connect to additional network components such as the second network component 108. Examples of a link include a twisted pair, coaxial cable, and optical fiber.

Each router 112, 116, 120, 124 within network 100 has a routing table denoting the network components that the router communicates with over a corresponding link. Each router 112, 116, 120, 124 can communicate with other routers 112, 116, 120, 124 in the network 100 using the Border Gateway Protocol (BGP), which is a protocol for exchanging routing information between routers. In particular, routers 112, 116, 120, 124 communicate by transmitting update messages to each other. These update messages may be sent periodically, such as once every thirty seconds. For example, a router 112, 116, 120, 124 may communicate its entire routing table to its closest neighbor every thirty seconds. The neighboring router transmits this information to its neighbor and so forth until all routers 112, 116, 120, 124 within the network 100 have the same knowledge of routing paths (a state known as network convergence).

A router 112, 116, 120, 124 may also transmit update messages to other routers 112, 116, 120, 124 to notify the routers 112, 116, 120, 124 of a particular routing change. For example, if a network component (e.g., a router 112, 116, 120, 124) becomes unreachable because of a hardware failure, the router that detects the problem redirects the traffic to an alternate router so that data continues to be transmitted. The detecting router also transmits an update message regarding the alternate path to the other routers.

In one embodiment, a router, such as the second router 116, includes a link probing mechanism 144. The link probing mechanism 144 analyzes one or more application sessions of a link or the entire link itself. The link probing mechanism 144 may distinguish between normal congestion (i.e., delay associated with the volume of traffic) on a link and congestion due to an attack. The probing mechanism 144 may be triggered (i.e., executed) "on demand" (i.e., may be executed to analyze an application session or link in real time).

Normal congestion on a link typically affects all application sessions on the link because the congestion is not selective—all of the packets being transmitted over the link are affected (e.g., delayed). When an attack occurs, however, a by-product of the attack is that a particular application session associated with a link is more likely to be affected. As a result, packets transmitted by the application session subjected to an attack experience delays but packets transmitted by other application sessions on the same link do not experience delays.

In one embodiment, corrective action is only performed if an application session experiencing an attack has some particular importance (i.e., has a priority above a priority threshold). Thus, in one embodiment if an application session is experiencing an attack and the application session is assigned a priority that is above the priority threshold, the link probing mechanism 144 performs corrective action on packets assigned to be transmitted over the application session.

The corrective action may include changing the queue used to store packets associated with the application session. By changing the queue, the packets may obtain a higher priority and so may be forwarded earlier. This earlier transmission may result in the packet not being dropped. The link probing mechanism 144 may also reroute packets associated with the congested application session to an application session on another link altogether.

Figure 2:
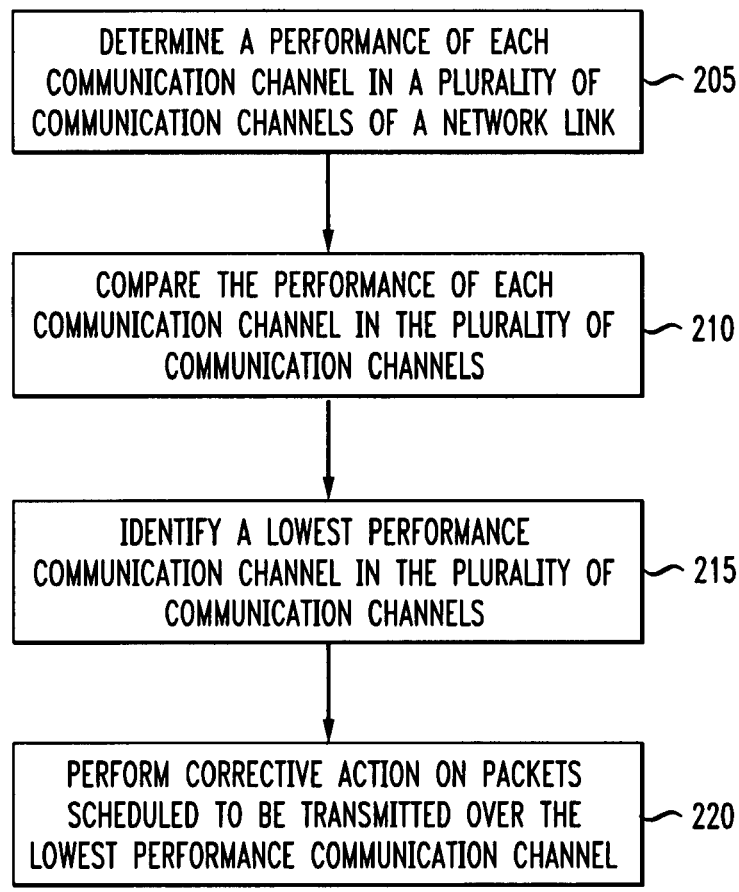
FIG. 2 is a flowchart illustrating the steps performed by a link probing mechanism to compensate for a performance degradation of an application session in accordance with an embodiment of the present invention.

FIG. 2 is a flowchart illustrating the steps performed by the link probing mechanism 144 to compensate for a performance degradation of an application session in accordance with an embodiment of the present invention. The link probing mechanism 144 determines the performance of each application session in a plurality of application sessions associated with a network link in step 205. The link probing mechanism 144 then compares the performance of each application session in the plurality of application sessions in step 210. Based on this comparison, the link probing mechanism identifies, in step 215, the lowest performing application session. In step 220, corrective action is performed on packets scheduled to be transmitted via the lowest performance application session.

For example, suppose an application session A associated with the first-to-second router link 128 is experiencing an attack. The attack causes significant performance degradation (e.g., delays and congestion) with respect to packets being transmitted from the first router 112 to the second router 116 via application session A.

In accordance with an embodiment of the present invention, the link probing mechanism 144 determines the performance of each application session using the first-to-second router link 128. If normal congestion on the first-to-second router link 128 was present, then all of the application sessions (including application session A) would be experiencing a delay (and, therefore, performance degradation). In this example, however, the link probing mechanism 144 compares the performance of each application session associated with the first-to-second router link 128 and identifies the application session A as having a worse performance than the other application sessions in the plurality of application sessions (e.g., significantly worse than the next lowest performing channel).

The link probing mechanism 144 performs corrective action on packets scheduled to be transmitted via application session A. Corrective action for packets that would normally travel via application session A over the first-to-second router link 128 may include rerouting the packets to the first-to-third router link 136. Thus, for packets whose destination is the second network component 108, the rerouting of the packets to the first-to-third router link 136 still enables the packets to reach their destination with one additional hop (i.e., with three routers being traversed in total (i.e., the first router 112 to the third router 120 to the fourth router 124) rather than two routers (i.e., the first router 112 to the second router 116) being traversed before reaching the second network component 108).

In one embodiment, the link probing mechanism 144 is used to analyze particular links carrying packets associated with particular applications. For example, packets corresponding to confidential information supplied by a user of the first network component 104 may always be transmitted from the first network component 104 to the second network component 108 via the first router 112 and the second router 116. Thus, the first-to-second router link 128 carries important, confidential packets. As a result, the link probing mechanism 144 may be configured to analyze the first-to-second router link 128 due to the nature of the packets being transmitted over link 128.

In one embodiment, particular links connecting the routers are used for BGP communications. If these links are targeted for an attack, considerable disruption may occur and may result in significant rerouting of traffic. These links, which are considered "high importance" or "high value" to the network 100, may be analyzed by the link probing mechanism 144.

In one embodiment, if the link probing mechanism 144 suspects an attack on a link used to carry particular packets, the particular packets are rerouted to alternate links. The probing mechanism 144 can execute, for instance, if a packet loss is seen within two successive standard retransmission window timeslots (e.g., two Transmission Control Protocol (TCP) Recovery Time Objectives (RTOs)). The probing mechanism 144 can probe the link and determine whether packet exchange is being delayed. If packet exchange is delayed, connection rerouting is triggered.

Figure 3:
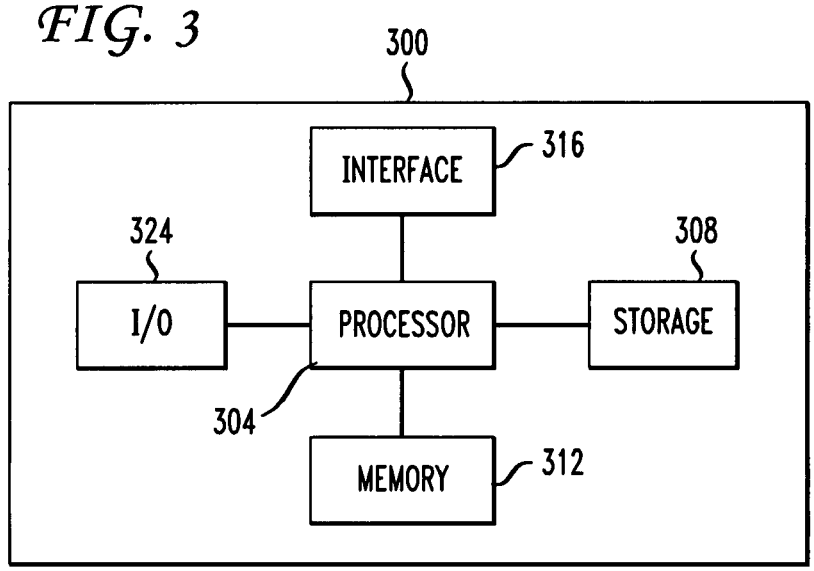
FIG. 3 shows a high level block diagram of a computer implementation of a network component in accordance with an embodiment of the present invention.

FIG. 3 shows a high level block diagram of a computer implementation of a network component such as a router having the link probing mechanism. Computer 300 contains a processor 304 which controls the overall operation of the computer by executing computer program instructions which define such operation. The computer program instructions may be stored in a computer readable medium such as a storage device 312 (e.g., magnetic disk, database) and loaded into memory 310 when execution of the computer program instructions is desired. Thus, the computer operation will be defined by computer program instructions stored in memory 310 and/or storage 312 and the computer will be controlled by processor 304 executing the computer program instructions. Computer 300 also includes one or more input network interfaces 306 for communicating with other devices via a network (e.g., the Internet). Computer 300 also includes one or more output network interfaces 316 for communicating with other devices. Computer 300 also includes input/output 308 which represents devices which allow for user interaction with the computer 300 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for compensating for a performance degradation of an application session associated with a network link, said network link being associated with a plurality of application sessions, said method comprising:
    determining at a network component a performance of each application session in said plurality of application sessions;
    comparing the performance of each application session in said plurality of application sessions;
    identifying, from said comparing, a lowest performing application session and a next lowest performing application session in said plurality of application sessions; and
    performing corrective action at the network component on packets scheduled to be transmitted over said lowest performing application session in response to determining a performance of the lowest performing application session is significantly worse than a performance of the next lowest performing application session.

2. The method of claim 1 wherein said performing corrective action further comprises rerouting the scheduled packets to another application session.

3. The method of claim 2 wherein said rerouting the scheduled packets to another application session further comprises storing said scheduled packets in a queue different than a queue used to store packets associated with said lowest performance application session.

4. The method of claim 1 wherein said performing corrective action further comprises rerouting said scheduled packets to another network link.

5. The method of claim 1 wherein said identifying a lowest performance application session further comprises determining that said lowest performance application session is experiencing an attack.

6. The method of claim 1 wherein said identifying a lowest performance application session further comprises determining that said lowest performance application session is a channel with a high priority.

7. The method of claim 1 further comprising determining that a packet loss is occurring within successive standard retransmission window timeslots.

8. A link probing system comprising:
    means for determining a performance of each application session in a plurality of application sessions associated with a network link;
    means for comparing the performance of each application session in said plurality of application sessions;
    means for identifying, from said comparing, a lowest performing application session and a next lowest performing application session in said plurality of application sessions; and
    means for performing corrective action on packets scheduled to be transmitted over said lowest performing application session in response to determining a performance of the lowest performing application session is significantly worse than a performance of the next lowest performing application session.

9. The link probing system of claim 8 wherein said means for performing corrective action further comprises means for rerouting the scheduled packets to another application session.

10. The link probing system of claim 9 wherein said means for rerouting the scheduled packets to another application session further comprises means for storing said scheduled packets in a queue different than a queue used to store packets associated with said lowest performance application session.

11. The link probing system of claim 8 wherein said means for performing corrective action further comprises means for rerouting said scheduled packets to another network link.

12. The link probing system of claim 8 wherein said means for identifying a lowest performance application session in said plurality of application sessions further comprises means for determining that said lowest performance application session is experiencing an attack.

13. The link probing system of claim 8 wherein said means for identifying a lowest performance application session further comprises means for determining that said lowest performance application session is a channel with a high priority.

14. The link probing system of claim 8 further comprising means for determining that a packet loss is occurring within successive standard retransmission window timeslots.

15. A non-transitory computer readable medium comprising computer program instructions capable of being executed in a processor and defining the steps comprising:
    determining a performance of each application session in a plurality of application sessions associated with a network link;
    comparing the performance of each application session in said plurality of application sessions;
    identifying, from said comparing, a lowest performing application session and a next lowest performing application session in said plurality of application sessions; and
    performing corrective action on packets scheduled to be transmitted over said lowest performing application session in response to determining a performance of the lowest performing application session is significantly worse than a performance of the next lowest performing application session.

16. The non-transitory computer readable medium of claim 15 wherein said performing corrective action further comprises rerouting the scheduled packets to another application session.

17. The non-transitory computer readable medium of claim 16 wherein said rerouting the scheduled packets to another application session further comprises storing said scheduled packets in a queue different than a queue used to store packets associated with said lowest performance application session.

18. The non-transitory computer readable medium of claim 15 wherein said performing corrective action further comprises rerouting said scheduled packets to another network link.

19. The non-transitory computer readable medium of claim 15 wherein said identifying a lowest performance application session in said plurality of application sessions further comprises determining that said lowest performance application session is experiencing an attack.

20. The non-transitory computer readable medium of claim 15 wherein said identifying a lowest performance application session further comprises determining that said lowest performance application session is a channel with a high priority.

21. The non-transitory computer readable medium of claim 15 further comprising determining that a packet loss is occurring within successive standard retransmission window timeslots.

* * * * *